(12) United States Patent
Gregory

(10) Patent No.: US 11,385,040 B1
(45) Date of Patent: Jul. 12, 2022

(54) PORTABLE OPTICAL SHAFT PROFILE WEAR MEASUREMENT GAGE

(71) Applicant: Baker Verdin Gregory, Chicago, IL (US)

(72) Inventor: Baker Verdin Gregory, Chicago, IL (US)

(*) Notice: Subject to any disclaimer, the term of this patent is extended or adjusted under 35 U.S.C. 154(b) by 538 days.

(21) Appl. No.: 16/522,413

(22) Filed: Jul. 25, 2019

(51) Int. Cl.
*G01B 3/56* (2006.01)

(52) U.S. Cl.
CPC ..................... *G01B 3/56* (2013.01)

(58) Field of Classification Search
None
See application file for complete search history.

(56) References Cited

U.S. PATENT DOCUMENTS

| | | | | |
|---|---|---|---|---|
| 1,714,780 A | * | 5/1929 | Hartness | G01B 3/40 33/199 R |
| 2,611,970 A | | 9/1952 | Johnson | |
| 3,469,321 A | * | 9/1969 | Riddell | G01B 5/252 33/501.12 |
| 3,732,626 A | * | 5/1973 | Miller, Jr. | G01B 5/20 33/501.12 |
| 4,325,189 A | * | 4/1982 | Fransson | G01B 5/166 73/162 |
| 4,417,402 A | * | 11/1983 | Hattan | G01B 3/40 33/199 R |
| 4,517,743 A | | 5/1985 | Och | |
| 4,856,198 A | * | 8/1989 | Hattan | G01B 3/48 33/199 R |
| 4,938,599 A | | 7/1990 | Goszyk | |
| 5,134,783 A | * | 8/1992 | Perry | G01B 3/36 33/645 |
| 5,199,175 A | * | 4/1993 | Green | G01B 3/48 33/545 |
| 5,271,271 A | | 12/1993 | Frazier | |
| 6,598,305 B1 | * | 7/2003 | McKinney | G01B 3/36 33/DIG. 14 |
| 6,799,928 B2 | | 10/2004 | Port-Robach | |

(Continued)

FOREIGN PATENT DOCUMENTS

| | | |
|---|---|---|
| CN | 2080163 A | 7/1990 |
| CN | 102506659 A | 6/2012 |

(Continued)

*Primary Examiner* — Christopher W Fulton
(74) *Attorney, Agent, or Firm* — Vangelis Economou; Economou IP Law

(57) ABSTRACT

Portable shaft wear measurement devices for, and methods of, measuring gage wear of driving elements, e.g., splines or keyways, on drive shafts, having at least one standard having a profile matching the profile of the driving element, the device being capable of disposing over the shaft when it is still attached to the machine that provides the driving force, so that when the device is installed over the shaft, the standard is capable of some angular rotation around a central axis, the degree of angular rotation being limited by the amount of wear of the driving elements, an indicator mechanism magnifying the amount of indication of wear by disposing the indicator radially outwardly of the central axis. A method of measurement using such a device, and a method of statistical regression analysis of wear of a shaft over time alerts when the shaft requires replacement.

12 Claims, 8 Drawing Sheets

(56) References Cited

U.S. PATENT DOCUMENTS

| | | | |
|---|---|---|---|
| 7,128,298 B1 * | 10/2006 | Johnson | G01N 21/95 |
| | | | 73/761 |
| 7,188,430 B2 | 3/2007 | Tange | |
| 7,730,627 B2 * | 6/2010 | Mashue | G01M 13/021 |
| | | | 33/501.7 |
| 7,745,805 B2 | 6/2010 | Johnson et al. | |
| 7,918,031 B2 * | 4/2011 | Wu | G01B 3/48 |
| | | | 33/555.2 |
| 7,946,047 B2 | 5/2011 | Smith et al. | |
| 8,164,758 B2 * | 4/2012 | Johnson | G01B 11/2425 |
| | | | 356/399 |
| 8,171,611 B2 | 5/2012 | Johnson | |
| 8,410,466 B2 | 4/2013 | Johnson et al. | |
| 9,482,527 B2 | 11/2016 | Murata | |
| 9,752,859 B2 | 9/2017 | Labat et al. | |
| 10,018,459 B2 | 7/2018 | Wuerfel | |
| 2005/0235507 A1 | 10/2005 | Badami et al. | |
| 2007/0058854 A1 | 3/2007 | Cackey et al. | |
| 2009/0179162 A1 | 7/2009 | Johnson | |
| 2012/0240422 A1 | 9/2012 | Katayama | |

FOREIGN PATENT DOCUMENTS

| | | | | |
|---|---|---|---|---|
| DE | 102013111986 A1 * | 4/2015 | | G01B 3/56 |
| GB | 2586449 A * | 2/2021 | | G01B 3/22 |

* cited by examiner

PORTABLE OPTICAL SHAFT PROFILE WEAR MEASUREMENT GAGE

BACKGROUND OF THE INVENTION

1. Field of the Invention

This invention relates generally to spline and keyway wear measuring gages and more specifically to the monitored measurement of wear in spline shaft gears and keyways which are disposed at heights or in cramped, dangerous, difficult or hard to reach locations, simultaneously avoiding disassembly of the machine in which the spline or keyway is disposed.

2. Background Art

Certain mechanical power transmission systems use involute splines and keyway systems to transfer torque between inner and outer members of a shaft, for example in a drive shaft. Over time, these involute splines or keyways are subject to wear as a result of repeated acceleration and deceleration cycles of the machine using the shaft, for example, in an industrial or construction crane, during operation as the shaft is deployed and the resultant loads are transmitted down the length of the shaft. The wear normally develops over a period of time, and can result in damage to the machine, which requires continual monitoring to avoid failure. Some applications require continual periodic monitoring in order to avoid catastrophic failure.

As technology becomes increasingly complicated and reliant on the precision manufacturing of components, for mechanical and electromechanical systems, such as aircraft, automobiles, weapons and power systems, mechanical transport and continual and precise maintenance are required in order to be able to rely on the proper operation of the system or device. A failure of a key or gear in a system may cause a catastrophic failure of the entire system, possibly resulting in the loss of millions of dollars and hundreds of lives at one end of a spectrum but certainly at the other end in long periods of downtime and delays in operations of the entity using these systems. For example, in large construction or transport cranes, a failure in one gear component may result in the crane to catastrophically cease operation, and possibly in the complete destruction of the crane and significant structures underneath it. Added jeopardy ensues if people are also present.

In an attempt to reduce the probability of a catastrophic systems failure, critical and some non-critical systems are required to satisfy predetermined operating tolerances before they may be used or continued to be used. Critical threaded components within these systems, e.g., gear splines or keyways, the failure of which may cause a catastrophic system failure, require periodic maintenance, evaluation and replacement if found to be out of tolerance established by safety inspectors and regulatory bodies.

Each of the critical components of a system, especially those moving relative to each other, including involute spline gears or keyways, must also satisfy operating tolerances. If a threaded component fails to satisfy these required design tolerances and/or performance specifications, degradation of system performance and/or a total system failure may occur resulting in damage to the system, at times leading to catastrophic results. These are to be avoided at all costs, both for safety and economic reasons.

One outcome of the above is the need to maintain a strict safety regime, and especially in the absence of reliable information as to the amount, severity and criticality of wear of components. That is, as components are examined and evaluated in the course of periodic maintenance, the parts are replaced prematurely strictly because the cost or replacement to avoid catastrophic accidental risk is much less than the cost of possible catastrophic occurrences and so failure avoidance takes a much more prominent role. Thus, to avoid these problems, it is easier and considered safer to swap out the critical components, i.e., splines, gears, gages and drive shafts that is absolutely necessary simply to be on the safe side of any questionable situation.

Proper responsible and inspection of shafts, gears, splines, etc. during periodic maintenance and overhaul is of utmost importance to the consumer and to the public for safety reasons, as worn components will effectively decrease the power transmission capacity of the spline junction, as well as increasing the threshold of positive probability that a failure in service will eventually occur. While the present discussion references a number of different types of components, for brevity of the disclosure, the components will be referred to herein as splines or spline wear gages, but should be considered to reference all types of shaft components, including splines, keyways, gears and gages.

Technically, spline wear measurement gages are of three types: mechanical, electronic or optical. Mechanical devices require very precise and highly calibrated pin or probe gauges, such as those shown and described in U.S. Pat. No. 4,517,743 to Och. Other methods of this type, for example, are shown and described in U.S. Pat. No. 5,271,271 to Frazier, include a precise pin measurement technique in conjunction with a meshing gear standard. All of the known mechanically operated gage wear devices are very sensitive to accidental displacement resulting from jarring or unexpected collisions received when not in a laboratory setting, thereby requiring lengthy and costly recalibration and resetting of the instruments before their use in the field.

Electronic gage wear devices are also subject to deviations when they are transported. Additionally, some such as those shown and described in U.S. Pat. No. 5,712,706, utilize a laser beam for study and mapping of, for example, gear teeth surfaces, to provide and record information on all features of a spline such as angular pitch, taper, etc. Helical deviations in screws are detectable using this method. Other methods of the prior art utilize video scanning and analysis to examine and characterize thread form. For example, U.S. Pat. No. 4,644,394 entitled "Apparatus for Inspecting an Externally Threaded Surface of an Object" to Reeves discloses an apparatus utilizing a video camera mounted in a translational frame which is itself mounted on a rotational assembly.

Generally speaking, nonintrusive detection is preferred so that the nut or spline does not have to be removed during the measurements. Early attempts of this concept can be found in nuclear plant "MOV" diagnostics. "MOV" diagnostics are required by the Nuclear Regulatory Commission as necessary to prove operability of valves needed to safely shut down a nuclear plant during an emergency event. The wear of a spline or threaded component is measured and indicated by "backlash" which measures the play between relatively rotating components, with "zero backlash" denoting minimal or no wear in the components. As early as the mid 1990's, the backlash "zero" region in the stem thrust/time trace could provide an indication that excessive stem nut wear existed. This wear could then be used as a criterion for whether an element of a precisely machined and intricately interoperable device required replacement prior to a risk of failure when that risk entered an unacceptable zone.

Because of the importance of keeping the operational integrity and safety of many critical components in the transportation, material delivery and other fields, there are numerous types of devices proposed and available commercially that measure thread and gage characteristics and other parameters, including measure of wear and criticality for replacement.

Other types of similar wear gauge measurement devices utilize micrometers or optical comparators to provide a measure of gage wear of a spline or keyway. However, there is a decided need for portability of such devices, for reasons of efficiency described above, and for avoiding significant downtime if a spline or keyway has to be removed for testing. Indeed, the amount of downtime incurred in a sophisticated machine is often costlier that the cost of a new spline. That is, if a spline has to be removed for testing, it is often more economical to simply replace it with a new spline, and avoid testing altogether to save time and avoid downtime of, e.g., a manufacturing system. However, removing a splined gear shaft from a machine to which it is attached adds to significant waste of time, operational resources and possibility of error in the spline replacement process.

What is needed is a non-obtrusive and efficient testing and gage wear measurement regime in which the shaft remains on the machine in which it is used while accurate and reliable wear measurement proceeds. Significantly, none of the prior art methods known heretofore teach the unique inventive combination of features, characteristics, and advantages provided by the invention disclosed.

SUMMARY OF THE INVENTION

Accordingly, there is provided herein a portable shaft wear measurement device for measuring wear on a drive shaft, the drive shaft having a driving element, the wear measurement device comprising a frame having at least one longitudinal frame member having a forward and a rear end, a shaft guide being positioned at a forward end of the frame being dimensioned and oriented to enable insertion over the shaft for which wear is being measured, a rear standard having a central aperture including an inner surface being dimensioned and oriented to enable insertion over the shaft, the inner surface of the central aperture including at least one corresponding element that provides for engagement in a mating relationship with the drive element of the drive shaft, the rear standard being angularly rotatable around a central axis, the degree of rotation of the standard being constrained by the engagement of the drive element of the shaft and the corresponding element of the standard, a wear indicating assembly attached to the rear standard capable of angularly rotating therewith and having an indicator that is disposed radially outwardly from the central axis, a sight mechanism for determining the amount A of angular rotation of the standard and wear indicating assembly as constrained by the engagement of the drive element of said shaft and the corresponding element of the standard, the sight mechanism coupled with the wear indicating assembly providing a measurement of wear in the drive element wherein the amount of angular rotation of the standard and wear indicating mechanism limited by the constraint on rotation by engagement of the elements being varied by the amount of wear of the drive element.

In a second embodiment both the front shaft guide and the rear standard comprise standards that include a central aperture that is shaped, dimensioned and oriented to receive a spline shaft, each of the standards having corresponding splines that are capable mating with and engaging the splines of the gear splines shaft of a shaft, the standards each being capable of angular rotation around the shaft so that engagement of the standard splines and the shaft splines restrain angular motion to only that degree which is limited by the wear of the splines on the shaft.

As disclosed and claimed, the inventive spline wear measurement device according to the present invention provides for a robust and portable device, that is, hand carried, for measuring spline wear, that does not rely on electronics or other sophisticated devices. One advantage of the inventive device is that it is robust and resilient to vibration and handling which these devices necessarily undergo when in situ maintenance and inspection operations on machine members are required, or if the machine and shaft assemblies are in a confined space or require aerial work to access. As such, the inventive device can be used in situations where the spline is difficult or very inefficient to remove for performing spline wear measurements.

In one aspect of the invention, the inventive above-described method may be used to provide for a monitoring function of spline wear over time using the precise measurements made available by the inventive portable optical spline wear measurement gage. Additionally, a predictive function, according to a mathematical formula, is incorporated into the measurement system which together with precise measurements of spline wear, gives an accurate and predictable wear profile that with recognized standards can be translated to provide a warning zone in which the operator is warned to replace a worn spline.

In yet another aspect of the invention, a method of measuring wear on a shaft drive, whether keyway or spline, is disclosed and claimed comprising wear gage of a spline shaft using a portable device having a forward internal spline standard assembly and a rearward internal spline standard assembly comprising the steps of dismantling a machine having spline shaft end portion with a profile the wear of which is to be measured so that the end portion of the shaft is free of any attached elements and the splines are unencumbered, fixing the position of the spline shaft relative to the machine to which the spline shaft is attached, disposing a standard in the rearward internal spline standard assembly having an internal profile matching the profile of the spline shaft end portion for which the wear is being measured transporting the device to the spline location, inserting a free end of the spline into and through apertures disposed in spline standards in each of the forward internal spline standard assembly and the rearward internal spline standard, the rearward spline standard having corresponding gage matching the gage of the spline, fixing a first extreme position of the rearward spline standard by rotating same within the rearward spline standard, calibrating the first extreme position to which the rearward spline standard can be rotated by noting the position of the standard by a relative rotation index mechanism, adjusting the rearward spline standard to second extreme position as far as is limited by the spline, the amount of rotational position adjustment being constrained by the amount of backlash being generated by the wear in the spline, measuring the difference in rotational angular displacement between the first and second extreme positions.

The optical system of the gage measurement device technically measures continuously variable data to a theoretically high degree of accuracy. The device converts a continuously variable measurement into a discrete measurement with the optical projection of the user's focused eye onto a front aperture. The information is indicative as viewed by the observer's eye into measurable indicators of "wear step" at a resolution of about 0.1 mm in the specific arrangement disclosed, but with more precise machining, the resolution showing the amount of wear can be enhanced to a wear step of less than 0.1 mm, e.g., to a range of between 0.05 and 0.08 mm, so as to provide better data for analysis and study. A number of discrete observations over set periods of time, e.g., during each inspection of the machinery in which the spline is being used, provides statistical and graphic indicia of wear, which can be taken with examination, more precise measurement by use of standard gage wear measurement methods, and analysis of the spline gage after removal from the machine in which it is operative will provide better predictive and wear projections refine the warning zone when a spline requires replacement. Higher resolution can be provided for measurement in wear step with advances made in optical instrumentation and machining of elements of the inventive wear measurement of spline gages, which advances can be anticipated but cannot be herein disclosed in detail.

In a preferred aspect of the invention, two standards are used to gage the wear of a spline or keyway. One standard has a protuberance with inner diameter teeth at an end of the protuberance in a nesting relationship with the outer or front standard, also having an inner tooth guide, so that the teeth cooperate to engage a spline gear from opposite rotational directions the standards moving the spline between two extreme values so as to provide more accurate indications of spline wear, as the wear on both the forward and back surfaces of a spline add to the measured wear.

In another aspect of the invention, there is disclosed and claimed a method of use of the inventive portable device to permit the on-site wear gage measurement of a spline without requiring the disassembly of the shaft or spline from the machine in which it is being used. This method of use includes the steps of transporting the portable gage wear measurement device to the site where a particular spline wear is to be measured, installing appropriate standards for the particular spline, disposing the device over the spline shaft so that inner diameter teeth of the standards engage the spline teeth, the standards being movable relative to each other and being able to gage the amount of spline wear by the difference in angular displacement between extreme positions. The extreme positions are constrained by the gear teeth of the spline, which will permit greater angular rotation when worn. The device converts the continuous variable data generated by its comparative measurement of the angular differences into measurable indicators corresponding to incremental wear step, the measurements being limited by the resolution being of the optical focus capacity of the human eye. Magnification and possibly laser indicators may be used to increase the resolution and precision of the device.

In another aspect of the invention, successive periodic measurements are tabulated, either manually or digitally, to provide for a wear profile for specific splines thereby to enable a user to theoretically predict an approximate time for when shaft replacement is required.

BRIEF DESCRIPTION OF THE DRAWINGS

The present invention will now be discussed in further detail below with reference to the accompanying figures in which.

DETAILED DESCRIPTION OF THE PREFERRED EMBODIMENTS

Figure 1:
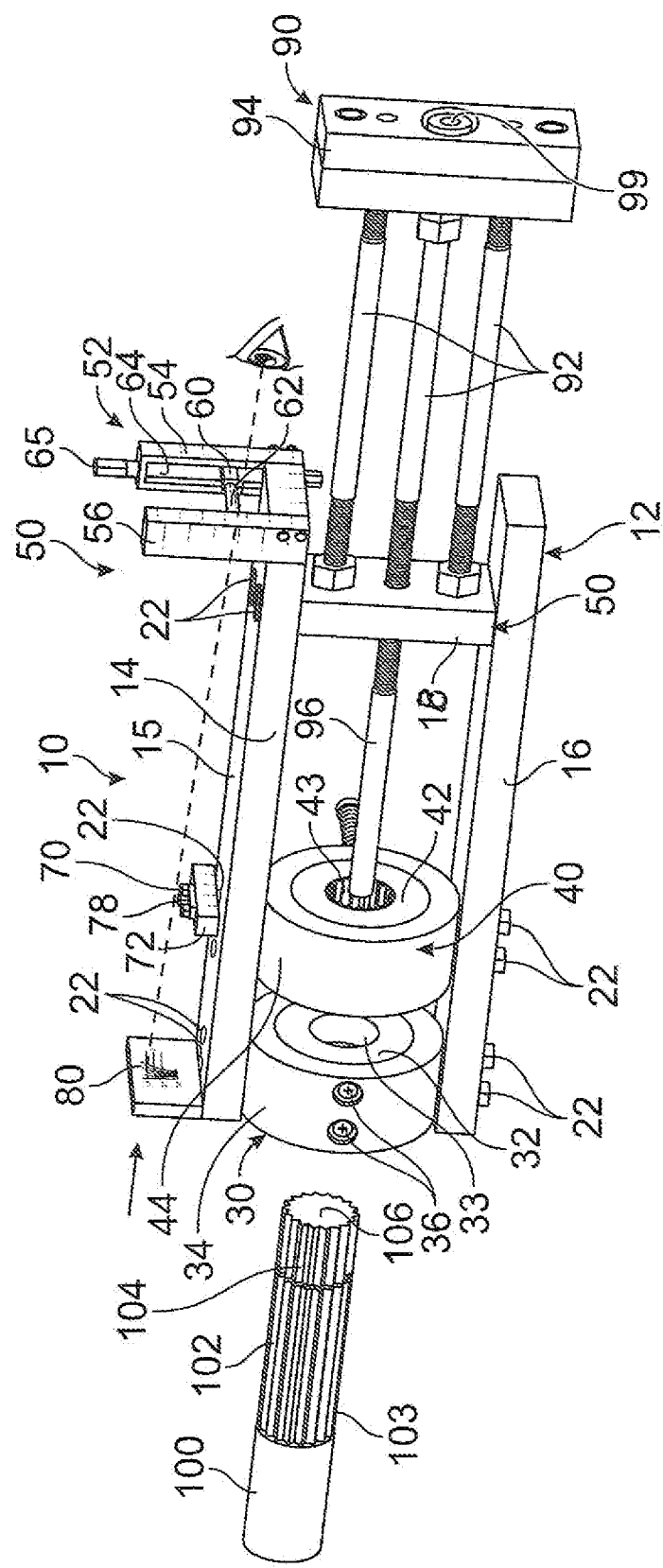
FIG. 1 illustrates in a perspective view a first embodiment of the present invention.
Figure 2:
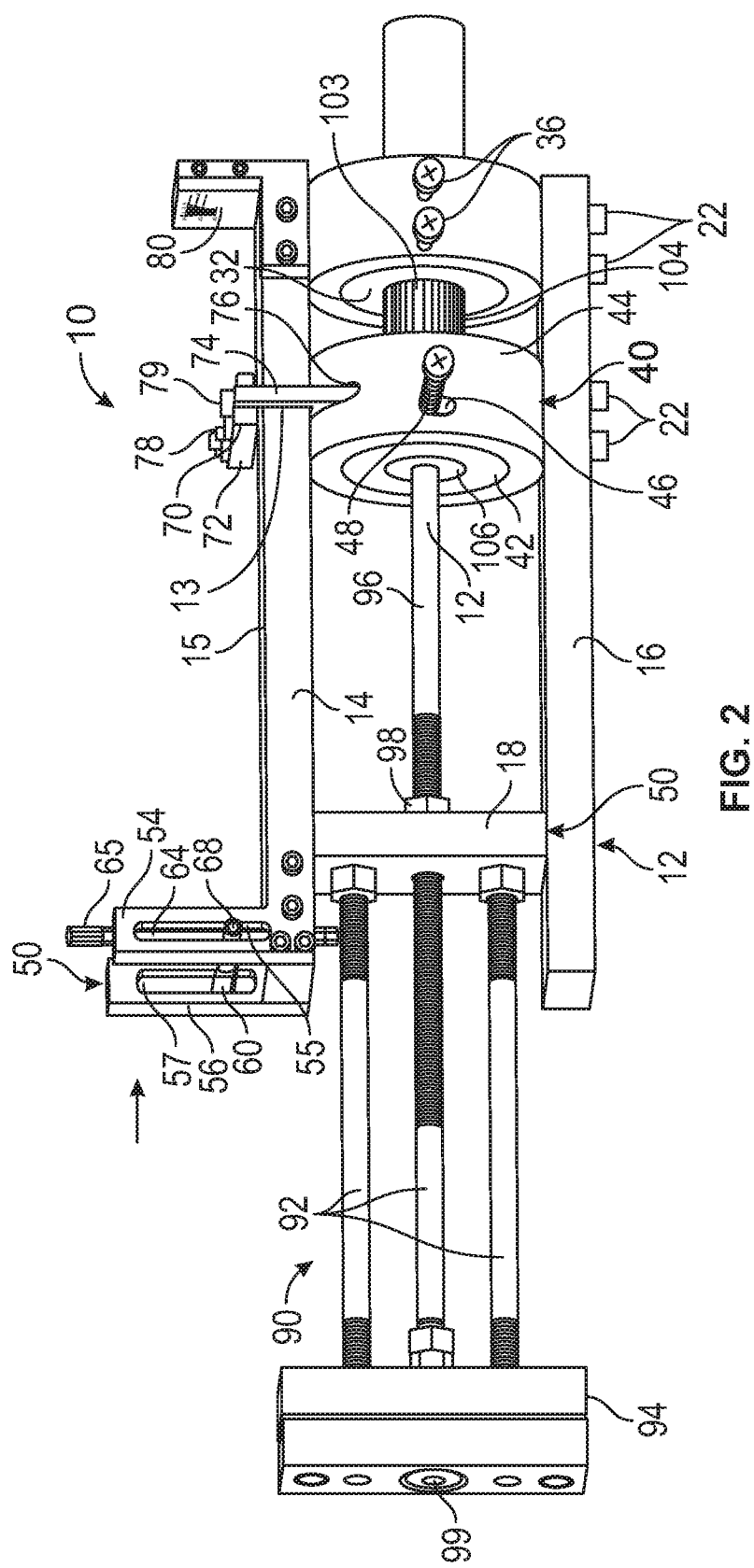
FIG. 2 is a perspective view from a different angle showing insertion of the spline into the device to enable for wear measurement.

Referring now to FIGS. 1 and 2, illustrated therein are two perspective views of the inventive device 10 shown in an assembled state taken from different angles. The perspective view of FIG. 1 is different from that of FIG. 2, as in FIG. 2 the inventive device is shown having been disposed over the splined shaft 100 with appropriate apertures in the device 10 permitting for the insertion of the spline shaft 100 within for purposes of performing the wear measurement. The spline shaft 100 includes teeth 103 extending longitudinally for a large extent of the shaft end. However, only a portion of the teeth surfaces are worn, and the worn teeth portion 104 in this area includes the portions of the gear teeth that are in normally contact with the mating gear teeth of the opposing gear of the machine in which the shaft is disposed (not shown, as having been removed) when the machine is in normal operation. An essentially circular end surface 106 of the shaft 100 is visible after the insertion into the device 10 (FIG. 2).

In FIG. 1, spline shaft 100, having an undetermined amount of wear on the gear teeth 102, indicated as that portion 104 of shaft 100, is shown in close proximity to measurement device 10. While shown as a free-standing element, the distal end of spline shaft 100 is connected to, for example, a driving mechanism, such as a motor or actuator (not shown), with which the present invention is contemplated for use. In normal operation, it is highly inefficient and economically inconvenient to completely disassemble the driving mechanism (not shown) to provide access to the spline shaft 100 for wear measurement, especially in cramped or dangerous spaces, such as atop an industrial crane. Thus, it is considered very advantageous to provide an accurate and reliable measurement of gage wear of the spline shaft so as to make a determination of whether the wear is nearing a predetermined level where safety may be compromised. If sufficient wear is indicated, that spline shaft 100 must be replaced after completely dissembling the driving mechanism. However, if that procedure can be avoided only until such time as it becomes necessary, significant downtime, economic loss and operator effort can be avoided.

As is shown in FIG. 1, the measurement device 10 is brought to the shaft 100 that is still connected to the driver mechanism so as to avoid disassembly. Only that portion 104 of the thread 102 which comes in to direct contact with the mating gear (not shown) of the machine to which the shaft is attached becomes worn from normal use, and it is shown at a proximal end of the shaft 100, adjacent shaft end surface 106, although wear can occur at any portion, or along all, of the splined teeth of the shaft 100, depending on the configuration of the machine to which the shaft 100 is attached. In any case, usually it is only this portion 104 that must be measured to determine the amount and severity of wear. In certain circumstances, it may be advisable to also measure an unworn portion of teeth 103 to provide a baseline in the amount of angular rotation that is present due to tolerance or dimension issues which amount of rotation may be discounted from measurements of worn portion 104, similar to a tare in a weighting device Thus, the measurement device 10 must take into account the position of where the measurements are to be made, as will be explained in greater detail below. The replaceable standards 32, 42 comprise a critical part of the device 10, and must have exacting tolerances, as wear in worn portion 104 will be measured against the corresponding female teeth on the inner diameter of and aperture of the rear standard 42 while the forward standard 32 fixes the rotational position of the shaft 100.

In respect of the gage wear measurement device 10 shown in FIGS. 1 and 2, a frame 12 provides for disposition and retention of the operational elements of the device 10, as will be described. These include a forward internal spline standard assembly 30 and a rear internal spline standard assembly 40 that are each connected to the lower bracket 16 and to the upper bracket 14 by an appropriate connector, such as socket head cap screws 22. Front sight assembly 70, and a target 80 are each connected to the upper bracket 14 frame 12, while rear sight assembly 50 is attached to the rear standard 40. Each of these operational elements of the device 10 will be described in greater detail below.

Frame 10 comprises a longitudinally extending upper bracket 14, a longitudinally extending lower bracket 16 and an upright bridge 18 at a rear end of the two brackets 14, 16 connecting the two brackets 14,16 to each other. Appropriate connectors, such as elongated set screws 22 (best seen in exploded view of FIG. 5), connect the brackets to each other through appropriate holes or apertures in upright bridge 18. The through holes may include countersunk shoulders (not shown), and the through holes correspond to threaded holes 17 in the surface of the lower bracket 16. Upright bridge 18 provides a positioning function which will be described below with reference to the standard assembly 40. The outer surface, that is, top surface 15 of the upper bracket 14 further provides for a base adapted to fix and support in alignment the calibrated front sight aperture assembly 50 and target 80, described below.

Forward internal spline standard assembly 30 shows one internal spline standard 32, which is one of a series of such standards 32. That is, there are two standards for each type of spline expected to be encountered in the field. The different standards come in pairs (forward or front for assembly 30 and rear assembly 40) and are categorized by the diameter of the spline shaft, and by the types and profiles of the gear teeth which they are expected to engage for measurement. For specific industries and machines utilizing the splines, such as for example, construction cranes, there are only a set number of types and configurations of the splines. Thus, a pair of standards will be required for each type of spline used in constructions cranes and expected in the field, and because the types of splines that will be expected are limited, only a certain number of pairs will be needed to be transported with the inventive device.

Each standard 32, 42 is in the shape of a toroidal structure having an internal cylindrical opening defined by inner surfaces 33, 43 and by an outer surface which come into contact with an inner surface of toroidal shells 34, 44 respectively. The openings defined by inner surfaces 33, 43 have an inner diameter which corresponds to the diameter of the shaft 100 that will be the subject of the wear measurement. As is shown in FIG. 1, the forward standard 32 has a surface 33 which does not contain any spline or gear teeth, and essentially acts as a guide for positioning and orienting the device 10 to enable it to fit over a shaft 100, etc. Rear standard inner surface 43 includes a splined surface which corresponds to the spline surface 104 of the shaft 100 to enable the teeth 43, 104 in the two surfaces to engage each other.

Pairs of standards 32, 42 are retained in kits (not shown) of several standards having spline and diameter configurations that will correspond to the expected types of shafts that may be encountered for wear measurement. The kits with the several standard pairs are transported to the site with the device 10 to be ready for use as the situation requires. An appropriate one of the standards 32 is installed within the outer shell 34 of the forward internal spline standard assembly 30. A particular standard 32 utilized for on site measurement of gage wear will accommodate the threads and diameter of the spline shaft 100 being measured.

The procedure includes measuring the amount of backlash for a spline enmeshing a worn section to be gauged, using an unworn section of the same spline as a retention mechanism to keep the spline in a predetermined position to obtain the wear step of the worn portion of the spline shaft measured. The forward or front spline standard 32 is held fixed by means of set screws 36 (FIG. 1) or locking screws 37 (FIG. 2) that impinge on its outer cylindrical surface of standard 32, thus fixing the standard 32 relative to the front outer shell 34, which acts as a receiver of the standard 32. The front and rear spline standards 32, 42 are uniform with respect to rotation held nominally to the reference of the centers of each of the respective outer shells 34, 44. As will be explained below, the front standard outer shell 34 has apertures through which the locking screws (22, 36) are threaded to retain the position of the front inner standard 32 steady, and so to fix the position of the shaft 100 when it is inserted into the central opening extending therethrough defined by surface 33.

Rear standard 42 is retained in rear outer shell 44 by the close tolerance between the outer surface of standard 42 and the inner surface outer shell 44 and by an actuating arm or lever, referenced herein as a handle 48 (FIG. 2) which is attached to the rear standard 42 by a threaded connection (FIG. 5) disposed on the outer surface thereof. In most instances, actuating arm 48 may be a long set screw, as shown, and the connection to the standard 42 is sturdy enough to enable an operator of the device 10 to actuate rotation of the standard 42 within the limits as described in greater detail below.

The rear standard 42 is not constrained in a steady position in reference to the outer shell 44 by any set screws, but is free to rotate within predetermined limits inside of the shell 44. As can be seen in FIG. 2, aperture 46 is in the shape of an oval with the long axis of aperture 46 extending in a circumferential direction. There is sufficient clearance of the dimension of the circumferential extent of aperture 46 to enable the actuating arm 48, once connected to the standard 42, to rotate the standard 42 within the shell 44, prior to insertion of the shaft 100 into the central opening 43. This would enable the actuating arm 48 to be transposed from one end of the oval aperture 46 to the other without other obstruction. However, the shaft 100, together with the teeth 103, is inserted into the central aperture and the end 106 and reaches its horizontal travel limit when surface 106 engages the end of rod 96. Of course, an additional constraint is introduced by the mating of the gear teeth of the spline shaft 100 with the gear teeth of the inner surface 43 of standard 42. The gear teeth meshing with each other will constrain the rotation of standard 42 within the shell 44 to only that extent that is limited by the wear of the teeth 103 on the spline shaft worn area 104, and the circumferential extent of oval aperture 46 must be long enough not to interfere with the movement of the handle 48.

While the gear teeth 103 of the spline shaft 100 are shown extending in a direction parallel to an axis of shaft 100, it is theoretically possible to have other shapes of gear teeth, for example, a corkscrew, or disjointed teeth profile (not shown), similar to prior art threaded shafts or screws, briefly described above in the background art section. The only difference is that the insertion of the shaft end 46 into the standard opening defined by surface 43 would have to include a rotation motion of the shaft 100 as insertion proceeds.

Referring again to FIGS. 1 and 2, rear sight aperture assembly 50 comprises a number of separate parts which are secured to a proximal end of the upper bracket 14. The first part is a movable transverse aperture bar 60, having a preferably closed 62 sight aperture, disposed between two upstanding arms, a proximate arm 54 and a distal arm 56, both of which are connected to the upper bracket 14 by fasteners 58 that are threaded into apertures in the side surfaces of the upper bracket 14. Traversing between the two arms 54, 56 is the transverse bar 60 having a centrally located sight aperture 62, best seen in FIG. 3. Referring again to FIG. 1, the sight aperture is a first point through which a line of sight is provided to a user's eye (EYE, FIG. 1) to determine the angular rotational motion of the standard 42, as described below.

Figure 3:
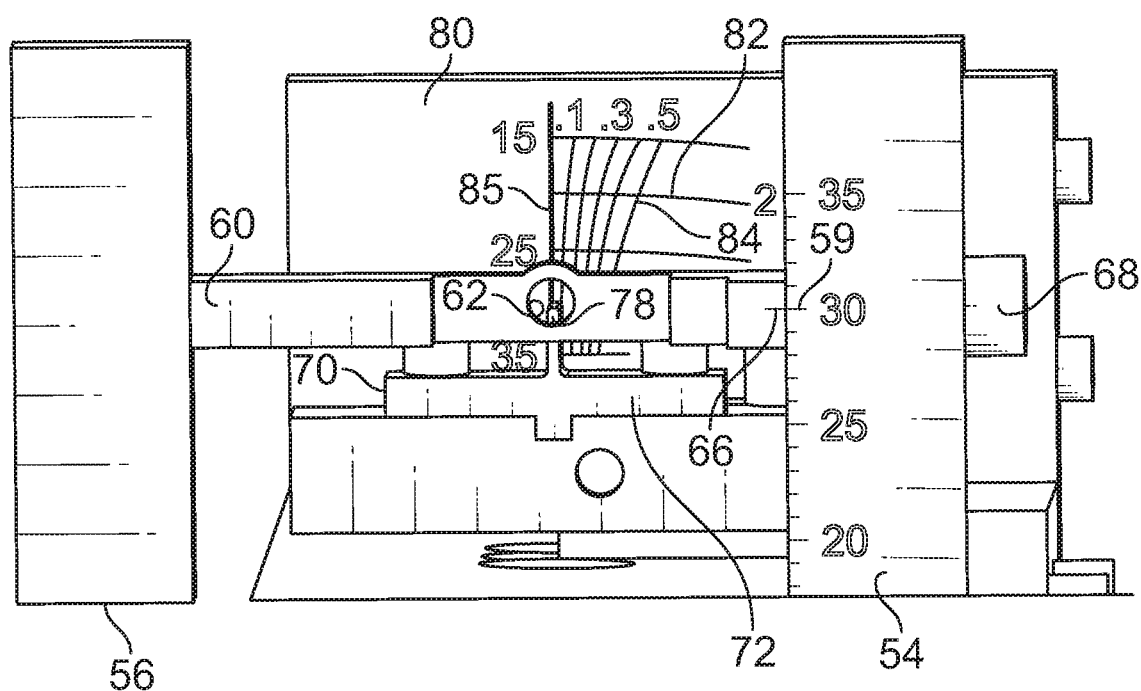
FIG. 3 is a detail view of the sighting mechanism that is shown in reference to the first embodiment of FIGS. 1 and 2, but which is applicable to all embodiments described herein.

Referring now to FIGS. 1-3, more readily shown in FIG. 2, upstanding arms 54, 56 each have longitudinal apertures 55, 57, respectively. Lateral ends of transverse bar 60 extend into each longitudinal aperture 55, 57 of each arm 54, 56 and the lateral ends are constrained within the longitudinal apertures 55, 57 to move only in a vertical direction, as shown. Located centrally between the lateral ends of the bar 60 is a closed aperture 62, as shown, which may take other forms such as an open sight, e.g., V-notch, as in some firearms.

As shown most clearly in FIG. 3, the transverse bar 62 has an indicator mark 66 which correlates with a vertical numbered gauge disposed on the far side of arm 54, the indicators being calibrated to correlate with expected average diameters of a shaft 100. The average diameter of the shaft 100, as defined below, provides the reading to which the indicator mark 66 is set to provide the appropriate readings. A threaded rod 64 engages a threaded aperture (not shown) in the proximal lateral end of the bar 60 adjacent arm 54 such that by turning a knob 65 attached to rod 64 in one direction will transpose the transverse bar 60 in a vertical direction upwardly or if in the other direction, downwardly. The screw adjustment on rod 64 is has close tolerance so that fine adjustments can be made to within a narrow range to carefully adjust the vertical position of the bar 60 according to the direction in which the knob 65 is turned, so as to line up the indicator mark 66 with an appropriate value shown on gauge 59 to reflect the average diameter of the shaft 100. An accurate adjustment of average diameter is important in obtaining an absolute value of wear of the spline.

The rear sight assembly 50 of the device 10 further operates in conjunction with two additional members, front sight assembly 70 and target 80, that allow the sight to operate and thereby to indicate the amount of wear. One of these include a front sight assembly 70 connected to rear standard 42. The other is a target 80 with predetermined striations 82 that indicate amount of wear depending on how much of an angular shift is limited by standard 42 when it is rotated by the handle 48.

Referring again mostly to FIGS. 2, 3, front sight assembly 70 comprises a horizontal bead mount 72 attached to the rear standard 42 by a vertical connecting plate 74, extending either through and appropriate circumferential opening 76 in outer shell 44 and in an opening 13 (FIG. 2) in upper bracket 14 or, as shown, or alternatively by a cantilevered connection (not shown) permitting vertical plate 74 to skirt the side wall of the upper bracket 14. The circumferential opening 76 in the outer shell 44 permits a small degree of freedom for angular, rotational shift of the vertical plate 74 when the standard 42 is rotated around the worn shaft end 104 (FIG. 1). Such angular, rotational disposition of the vertical plate 74 when standard 42 is rotated by handle 48, necessarily will rotate the horizontal bead mount 72, and because the bead mount 72 and sight post 78 is radially outwardly further from the axis of rotation of the standard 42, will provide a more pronounced disposition of the sight post 78.

The attachment of vertical plate 74 to the standard 42 through the opening 76 is preferably removable so that the cantilevered bead assembly 70 can be attached to another standard of different size when the need arises to measure gage wear of a different size shaft 100 or of one having a different tooth configuration. The changeover of the standards from one to another is discussed in greater detail below with reference to the second embodiment device 210 (FIGS. 4-7), but it should be understood that that discussion is applicable to all the embodiments.

To permit the assembly 70 to connect to rear standard 42, there is provided a long set screw or bolt 79 extending longitudinally through an internal groove or aperture of the vertical plate 74. Bolt 79 has a threaded end that is capable of screwing into a suitable threaded aperture (not shown) in an upwardly facing portion of circumferential surface of standard 42. That is, when another standard 42 from the accompanying kit is needed for measurement of a different type of spline 100, bolt 79 is unscrewed from standard 42 and once the handle 48 is also disconnected, the standard 42 can be easily removed from the surrounding outer shell 44 by axially sliding it so that it clears the end of the shell 44. To replace the standard 42 with another desired standard 42, the replacement standard 42 is first slid axially into the shell 44, and handle 48 and bolt 79 are screwed into the surface of the standard 42, which together with the close tolerances of the inner surface of shell 44 and outer surface of the standard 42 restrict significant axial or horizontal motion of the standard 42 relative to the outer shell 44. While it is considered to have close tolerances between the vertical plate 74 and the aperture 76, and between handle 48 and its aperture 46, through which each of them extend, there should be some small clearance to permit a degree of angular rotation of the attached elements 42, 48 and 74.

As is seen in FIGS. 1 and 3, horizontal bead mount 72 further comprises a front sight, shown as a front sight post 78, that will, in alignment with the rear optical closed sight 62 disposed in transverse bar 60, provide a line of sight shift in the position where the two sights meet the target 80 as shown in FIG. 1 and by arrow in FIG. 2. While a front sight post 78 is shown in this embodiment, any type of front sight is capable of providing the sighting function, including a bead, ramp, or ring (not shown) that can align the user's eye with the post 78 and indicators on target 80. The front sight post 78 and rear optical closed sight 62 together operate much as would a long-range rifle sight and appropriate modifications may be made to make the sights in actual use to operate in a more precise and a better indicator of average spline wear.

The target 80 can take any of a number of forms, but as shown in FIGS. 1-3, is a planar sheet, preferably made of an appropriate metal, having a flat surface on which striations 82, 84 are inscribed to show an absolute value of wear. As shown, the striations are in the form of a geometrically curved Cartesian graph, in which the basically horizontal vertical lines 82, i.e., the ordinate, indicate the average diameter of the shaft or spline the wear of which is being measured. As shown in FIG. 3. the transverse bar 60 is at a level for measuring a spline having a 30 mm diameter, and as can be seen, the indicator mark 66 lines up with the value of 30 mm on gauge 59, and as the rear sight 60 lines up with the same diameter value on the ordinate 82 on target 80, that is, 30 mm when the front and rear sights are lined up. The two values from the target ordinate 82 and gauge 59 will corroborate each other and will also provide a mean or estimated reading for values between the striations. The basically vertical axis, or abscissa, values indicate the absolute amount of average wear of the splines when the standard is rotated between the one extreme rotational position and the other extreme rotational position as limited by the interaction of the splines 104 with the standard 42, as explained above. That is, as standard 42 shifts rotationally from a reference position, i.e., as the front and rear sights 62 and 78 will meet the leftmost abscissa value 85 indicating "0.0" wear, to a wear point at a target position to the right, to stop at a value of a vertical abscissa 84 as marked in the absolute values at the top of the graph, and will show wear values in mm of from 0.1 to 0.5 mm, or as appropriate for the conditions expected in the machines in which the splines are used.

To assist in insertion of the device 10 over the shaft, and more significantly, in removal of the device 10 from the shaft 100, an optional pusher assembly 90 is attached to the frame of device 10 by, for example, several rod and nut connections, as shown. Pusher assembly 90 takes the familiar form of rifle stock and in conjunction with front and rear sights 62, 78 provide for a familiar action to use the device 10. Pusher assembly 90 comprises a number of horizontally extending rods 92 which are attached at a distal end to upright bridge 18, and at a proximate end to an upright or vertically extending member 94, similar to that of a butt plate in a rifle stock, the attachments being made by threads in the ends of rods 92 and several nuts as shown, or other appropriate means. Another threaded rod 96 extends from the upright bridge 18 and toward the rear standard assembly 40, with the axis of rod 96 being contiguous with central aperture of standard 42. The distal end of rod 96 can be extended into the standard central aperture and by screwing nut 98 or if the rod 96 is, as preferable, a single extension of the middle rod 92, then rotating bolt 99 within a threaded aperture in vertically extending member 94 to actuate rod into the central aperture and thereby expel shaft 100 that has bound to the standard.

In operational use, the device 10 is assembled using, e.g., metric Allen keys for adjusting the set screws 22, 36 to engage and fix the positions of the standard 32 within the outer shell 34. The device 10 is then positioned adjacent the shaft 100 the wear of which is being measured, making sure that the central apertures of the standards 32, 42 are aligned to receive the worn end portion 104 of the shaft 100 and engage that portion only in making the measurements. The operator dials the front sight 62 into the correct setting for the predetermined spline average diameter of the shaft 100. To do this, the operator loosens locking socket head cap screw 68 (FIGS. 2 and 3), and rotates the rear sight adjustment knob 65 until the transverse bar 60 including rear sight aperture 62 (FIG. 3) on gauge 59 line up with the appropriate rear sight setting 84 on target 80.

The operator then locates the end of the spline shaft 104 onto the front face of the forward spline standard 32 and the central apertures of standards 32, 42 are then brought over and onto the shaft 100, with the worn part 104 being inserted into the central aperture of the standard 42. Close attention must be paid in this procedure because the splines of the worn section 104 need to be aligned with the corresponding splines on the standard 42. Once alignment is completed, the operator will push the device 10 onto the shaft 100 until the face of the pulling rod 96 meets the front face 106 of the spline shaft 100 being measured.

In reference to FIGS. 1 and 2, the device 10 has received a shaft 100 inserted up to the maximum permitted by the end of the rod 96 of the optional pusher assembly 90. The operator must ensure that the splines of the standard 42 and those of the appropriate shaft section 104 line up and are abutting each other. The operator can hold the device 10 by the upright bridge 18 in one hand as one would hold a pistol grip and use the vertically extending member 94 as one would use a butt plate of a rifle stock to position the operator's eye (FIG. 1) and enable the user to see through the sights 62, 78 as projected onto target 80. The next step is to push handle 48 counter clockwise as far as possible. The operator should then position a dominant eye in the prescribed location for use of the front and rear sights 62, 78, and obtain a sight picture of the target as shown in FIG. 3. The point where the two sights meet target 80 is the top dead center zero reference.

After checking for the zero reference, the operator will push handle 48 as far clockwise as possible and check the sight picture (as seen in FIG. 3). If the potentially worn shaft spline section 104 possesses a wear step, it will be indicated at the appropriate circumferential arc length arcuate line 84 of target 80 as the standard 42 is rotated angularly by the handle 48. As described above, the lines 84 are separated in one-tenth millimeter (0.10 mm) increments. Values reported for wear are to be interpreted as falling into 0.1 mm intervals, rounded upward to ensure that any doubt is treated for safety as an indication for replacement, if needed. Therefore, measurements between values should be recorded as being between 0.1 mm incremental values, or if greater precision is provided, e.g., by a reticle or by other more precise measurements. The amount of wear that militates for replacement of a worn shaft can be established either by tabulated wear guidelines determined through long-time monitoring of spline failures and from statistical records, or alternatively, by factory specifications which can be evaluated in conjunction with the monitoring of shaft replacement in the field.

The operator can then pull the device off the shaft 100 by pulling upright bridge 18 away from shaft 100. If the shaft binds to the standard aperture, or if the operator does not have the strength to dislodge and pull the device 10 off, the emergency pusher of pusher assembly 90 can be used. To operate the emergency pusher, the operator uses a wrench to break loose the emergency puller locking jam nut 98. Then, the operator can take a thin walled socket and a ratchet to turn the rear buttstock actuating jam-nut 99 clockwise. The pusher rod 96 will then project forward at the rate set by the threading in the aperture of the upright bridge 18 and the forward end of rod 96 will engage and with continued screwing of nut 99 will actuate the surface 106 of the shaft 100 to unbind it and render it easier to remove.

Once the device 10 has been detached from the shaft 100, the operator just loosens the rear vertical plate actuating jam-nut 99 until the face of the pusher rod 96 is in the desired position, and the pusher locking jam nut 98 can be tightened against the face of the upright bridge 18 by turning it counter clockwise with the device 10 facing forward. This will re-secure the emergency pushing rod 96 from further motion in the axial direction.

Other methods of indicating wear of the splines 104 can be used and will be readily apparent to a person of ordinary skill in the art. For example, relative values of the amount of wear can be utilized instead of the absolute values as described and shown. That is, instead of showing a specific amount of wear as measured in positive increments of 0.10 mm, relative values can be assigned, which values can be calibrated to the amount of wear on a particular spline of a specified diameter. The relative values can then be independently calibrated to real time measured wear to provide an indication, whether by graph, incremental table or other means, to indicate that so much wear has occurred relative to a known baseline. Once a specified amount of wear as independently measured by other means is calibrated to known values when replacement of a spline is required, the relative value is marked either on a graph, or on the target, so that the operator can take the appropriate action.

The optical gage measurement device 10 operates similarly to that of a peep sight on a standard optically sighted rifle. Centrally located rear sight closed aperture 62 acts as a rear aperture, the height of which is adjusted to match the diameter of the shaft profile being gaged similar to how a rifle sight can be adjusted for distance to the target. When the device 10 is installed over the shaft 100, the front and rear internal spline standards 32, 42 are to be engaged with either the worn 104 or unworn 102 portions of the spline shaft 100. Then the user peers into the rear closed sight aperture 62 and lines up the middle movable sight post 78 with the target 80 visible in the aperture of rear closed sight 62 (FIG. 3). The middle movable sight post 78 will fall between the A curved lines 84 representing wear in 0.1 mm increments. Proper adjustment of the per rear sight closed aperture 62 will automatically place the front movable sight post 78 in the right area of the aperture display for the correct measurement to be made. Typically, the user will gage as a base or control the position of the line of sight through the sights on the target 80, and can manipulate the rear standard 42 to a position where the wear shows at 0.00, or on the left-most vertical line 84 of target 80 (FIG. 3). Then the device is pushed forward or rearward on the spline shaft 100 so that the worn portion 104 is within the central aperture of standard 42 and the teeth 43 engage the teeth of the worn portion 104. The difference in the amount of rotational displacement between the baseline and the spline shaft worn portion, as measured on the line of sight indication on target 80, will provide a value of wear of the shaft worn portion 104. The user can then document how much wear or lash a given length of shaft profile possesses in terms of rotational displacement, as shown in FIG. 3 in tenths of millimeters.

The nominal values establishing the display on the front aperture were derived using an extrapolation of the values of the shaft diameter, and the amount of wear was theoretically derived from the following mathematical equation:

$$\text{Degrees Offset (degrees)} = \frac{360 \cdot w}{d \cdot \pi} \qquad (1)$$

where w is the amount of wear in mm;
d is the average diameter of the spline shaft; and
Degrees of Offset defines the amount of angular rotation of the standard 32 relative to the shaft 100 in degrees, or tenths of degrees. The average diameter of the spline is known to be the sum of the outer diameter of the teeth plus the inner diameter of the troughs between the teeth divided by 2.

Wear in Offset Degrees can be used to calculate w then convert it to its rotational percentage of backlash to determine when the amount of wear approaches the stage in which it requires replacement. The linear relationship between angular rotation of the standard 32 relative to the baseline and the gage wear can be found by calculation theoretically, and can be calibrated by independent backlash measurements to determine whether the wear has reached a point of replacement of the shaft as will be explained below in reference to FIG. 10. As the spline surfaces wear, the backlash will increase, allowing more free angular rotation, which can be used as a rough but fairly accurate guide to wear. The purpose of the method and apparatus of the present invention is to measure spline gage wear, either in absolute terms or in percent ("backlash percent"). Once the backlash percent is tabulated over a period of time, the remaining spline material in each spline can be calculated to provide the basis to determine gear operability.

Upon obtaining the angle of offset required for a given amount of wear of a spline of given average diameter, trigonometry can be used to project the relevant line of sight indications through the rear sight 62, across the moving front pin sight post 78, and onto the target 80. The sighting system operates as a conic section projecting toward the front at a central point behind the rear of the instrument, and is intuitive to the user as it is configured.

As described above, the device can be calibrated to absolute or relative values, depending on the needs of the user. However, in determining the type of calibration, it should be kept in mind that measurement errors need to be considered in the evaluation. For example, a slight degree of angular rotation will be present, even when no wear is present, that can be attributable to the inherent very small but normal oversize of the spline, or shaft keyway (FIGS. 7-9) that is necessary to permit the slip fit of the device onto the shaft 100. While more exacting tolerances may be employed, a very slight amount of leeway is necessary so that the device 10 can be fit over the shaft 100. Indeed, one function of the pusher assembly 90 is to free the shaft from engagement with the teeth 43 of the standard 42 after the measurements have been completed in the event the tolerances are so close as to cause the shaft to bind. As described above, when the tolerance is very tight, there is the possibility that the shaft 100 will bind within the standard 42 so that the operator will be required to push the shaft 100 out of the device by operation of the rod 96 as actuated by the head screw mechanism 99.

One method that has been considered to significantly reduce measurement error is for the inventive device is to provide for a double angular rotational shift around the shaft to reduce possible statistical error wear measurement thereby increasing measurement accuracy. Such a mechanism is shown in the second, and preferred, embodiment of wear measurement gage device 200 illustrated in different views in FIGS. 4-6. As can be seen from a comparison of the two embodiments in FIGS. 1-3 and 4-6, many of the elements illustrated in the two separate embodiments, and indeed also in the third embodiment of the device 300 (FIGS. 7-9, described below) are in most respects identical. Thus, those elements that are identical are identified herein by the same identification numeral. For those elements that differ from one embodiment to the others, they will be identified by a number in the series of the embodiment, the device 200 showing such different elements in the 200 series, that is, preceded by a prefix of 2 and for the third embodiment preceded by a prefix in the 300 series. Those different elements that provide identical or similar functions in each embodiment, the appropriate prefix will precede the same identification numeral as that identified in the first embodiment.

Figure 4:
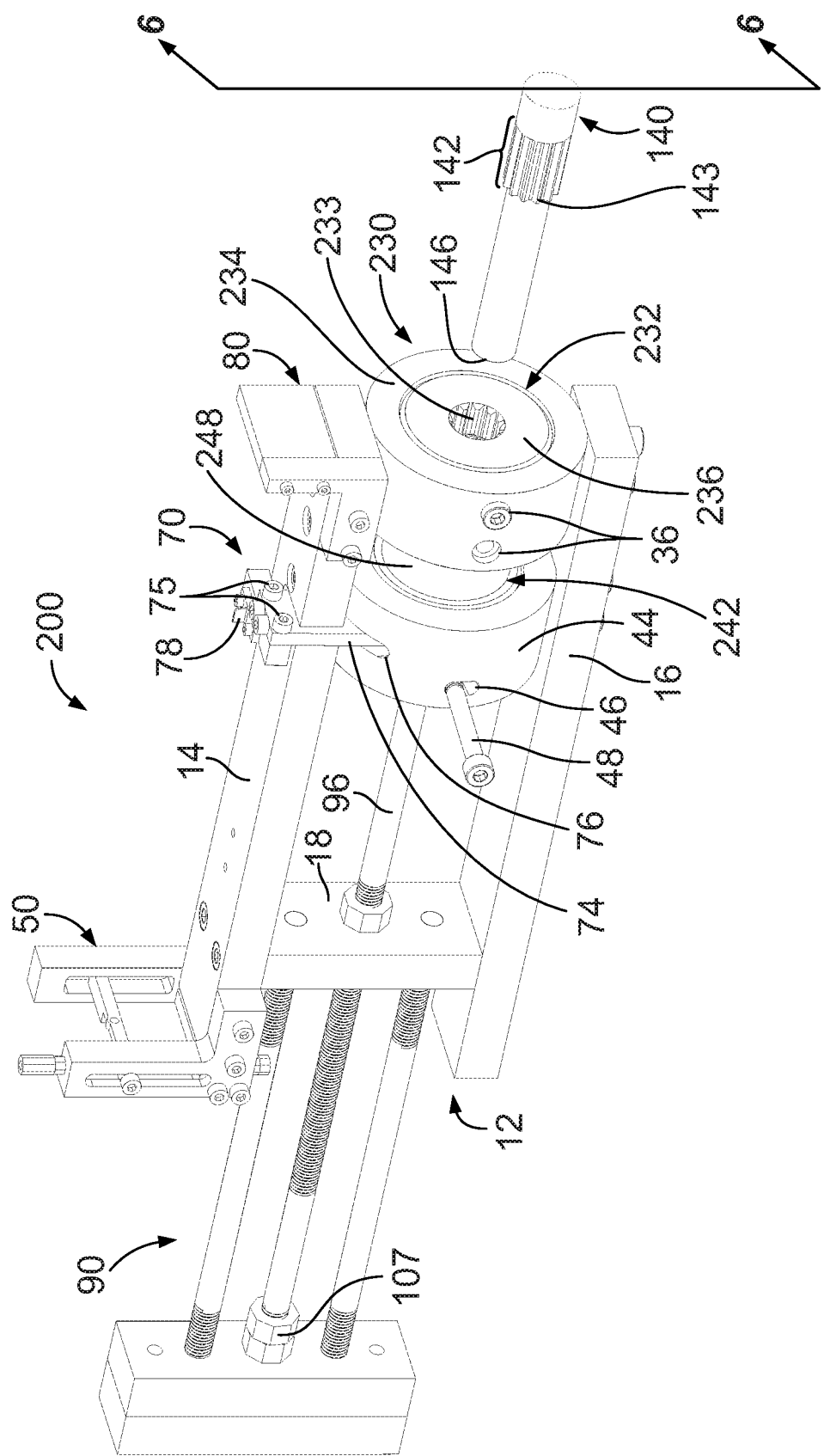
FIG. 4 is a perspective view of a second embodiment of the inventive device.
Figure 5:
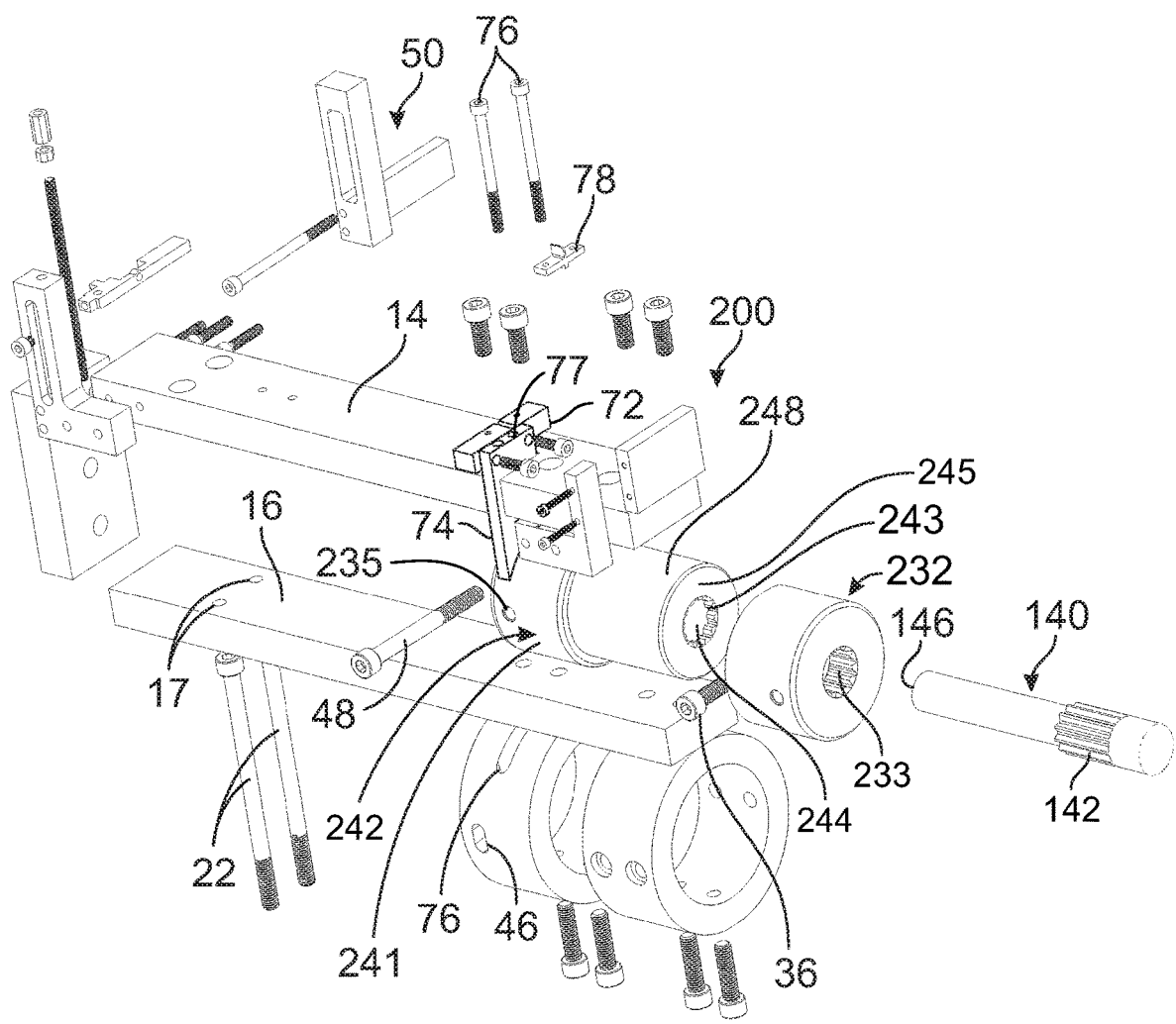
FIG. 5 is a partial exploded view of the second embodiment illustrated in FIG. 4 with the optional pusher mechanism omitted for the sake of simplicity and clarity.
Figure 6:
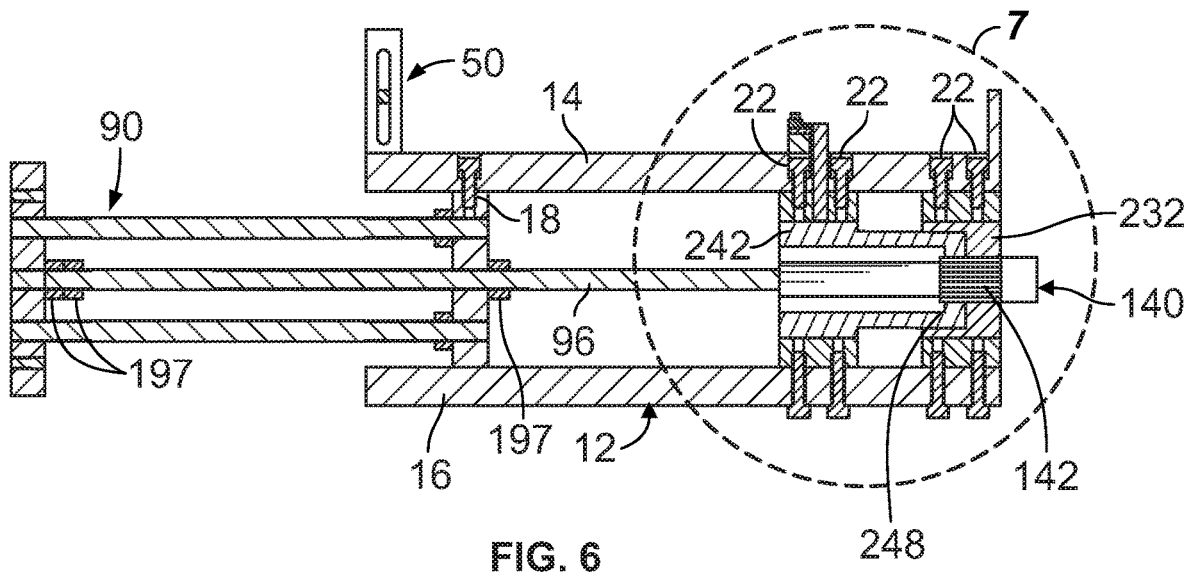
FIG. 6 illustrating a cross-sectional view of the second embodiment illustrated in FIG. 4 taken approximately along the lines VI-VI.
Figure 7:
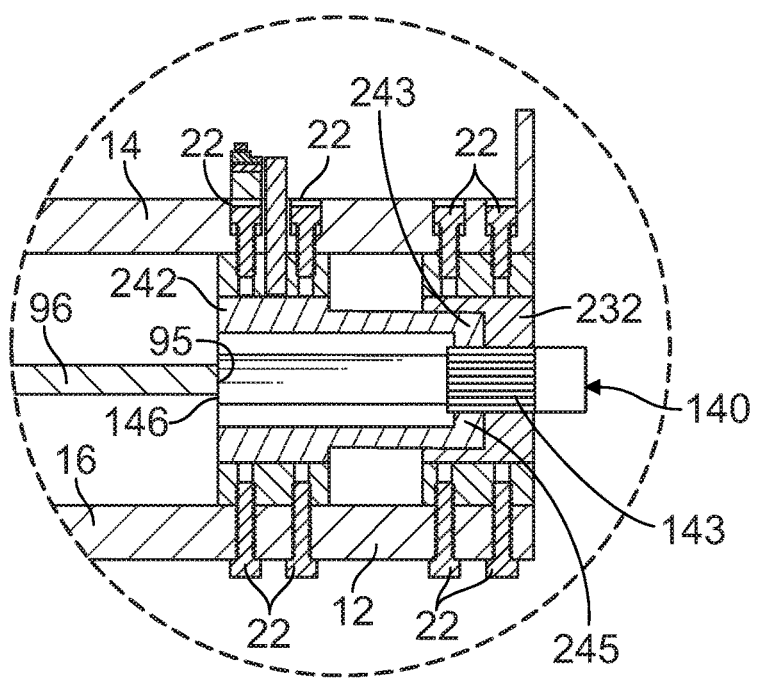
FIG. 7 is a detail of the cross-sectional view of the second embodiment of the inventive device shown in FIG. 6.

Referring now to FIGS. 4-7, several views of device 200 are shown, FIG. 4 being a perspective view, FIG. 5 being a partial exploded view and FIG. 6 illustrating a cross-sectional view showing the interaction of the elements as they engage the shaft 140. FIG. 7 is a detailed view clearly showing the interrelation between the standards 232 and 242 in their engagement to the splines of the shaft. It is noted that shaft 140 has a different configuration from that of shaft 100, in that the splined portion 142 is set back from the end 146 of shaft 140. For purposes of this discussion, the splined portion 142 will be considered to be completely worn along the full axial extent of splined portion 142.

Most of the elements of wear gage measurement device 200 are essentially identical to that of the device 100 described above, and thus are identified by the same identification numerals. This includes all of the elements of the assemblies, such as the frame assembly 12, the calibrated sight aperture assembly 50 at the rear of the device 200, front sight assembly 70, target assembly 80 and optional pusher assembly 90. The description of the structure and functions of these assemblies is described above apply equally and are incorporated herein with respect to the device 200. The individual elements will not be described and may not be separately identified in the illustrations of the second embodiment device 210 in FIGS. 4-6.

Figure 8:
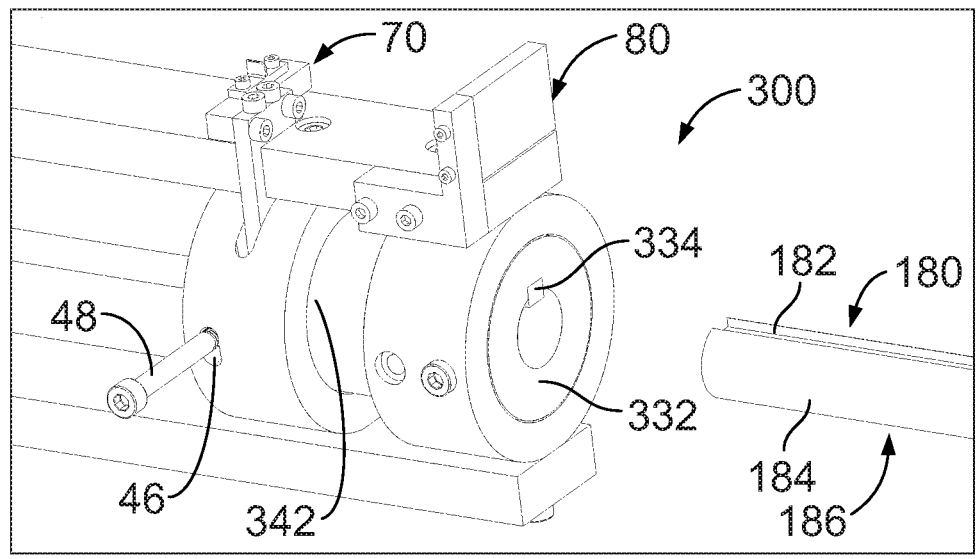
FIG. 8 is a perspective view of a third embodiment of the inventive device for use when measuring sear of a key and keyway configuration.
Figure 9:
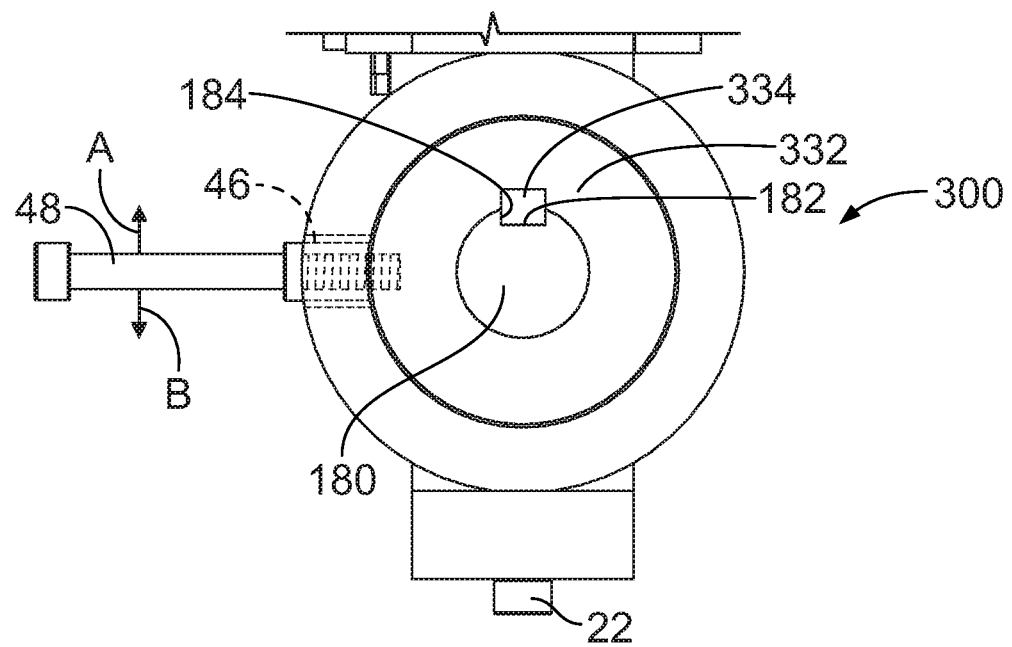
FIG. 9 is an end view of the third embodiment illustrated in FIG. 8 showing the keyway and the available angular rotation allowed by the wear of same.

The assembly 70 and its connection to the standard 242 will be described in greater detail, keeping in mind that the connection configuration for this embodiment 210 is applicable to all three embodiments 10 (FIGS. 1-3), 210 and 310 (FIGS. 8, 9). The vertical plate 74 is connected to standard 242 by two long set screws 75 (best seen in the exploded view of FIG. 5) extending through apertures 76 which extend and attach to corresponding threaded holes (not shown) disposed in an upwardly facing position of the standard base 241. As can be seen in FIG. 4, two set screws attach the plate 74 to the horizontal bead mount 72 so that sight post 78 is integrally attached to the plate 74, and any angular rotation of the plate 74 is reflected in a similar angular reputation of the sight post 78. However, because the sight post 78 is disposed radially outwardly of the axis of angular rotation of the standard 242, and simultaneous axis of rotation of plate 72, a slight degree of angular rotation of the standard 242 translates into a significant absolute linear change in position of the sight post 78 and the corresponding projection on the target 80 to maximize the wear indication as measured by the device 210.

One major difference between the two embodiments of FIGS. 1-3 and 4-7 is in the shape and resulting function of the two standards, which in this embodiment (FIGS. 4-7) takes the form of a front standard 242 and a rear standard 232. As seen most clearly in the exploded view of FIG. 5 and in the cross-sectional views of FIGS. 6 and 7, the standards 232, 242 are in a nested relationship, the rear standard 242 having a protruding nose section 248, terminating in an end wall 245 having a central aperture 241 comprising a circumferential splined or toothed surface 243. The protruding nose section 248 fits within an annular cup-shaped cavity defined by the outer wall of the standard 232 and the end wall 236.

Significantly, the purpose and function of the engagement of the splines of toothed surface 243 of the rear standard 242 provides for a second and essentially independent indication of gage wear that complements that of the indication provide by the front standard 232. That is, the front standard 232 includes an aperture in end wall 236 having a toothed surface 233, different from the smooth surfaced central aperture 33 of FIG. 1. Teeth or splines on the surface 233 engage corresponding splines of worn section 142 of shaft 140. Thus, both standards 232 and 242 rotate relative to the shaft 140, and in engagement of the teeth in the inner surfaces of the central apertures of each standard 232, 242 with the splines of worn section 142, each provide for a separate and relatively independent angular rotation measurement, as discussed above in reference to the standard 42 (FIGS. 1-3).

The standard 242 has an annular configuration including base 241, and nose section 248, which terminates at an opposed end to the base at end wall 245. End wall 245 has a central aperture 244 which has splines or a toothed surface 243 that corresponds to the spline configuration of the shaft 140 and meshes with splines 143. End wall 245 extends axially (horizontally) for a short thickness, as best seen in the exploded view of FIG. 4 and detail cross-sectional view of FIG. 7, rendering the rear standard 242 in the form of a cup having a hole at the end further from the opening. Aperture 244 must have a minimum diameter to accommodate the diameters of all shaft diameters that are expected to be inserted into the device 210, and should ideally correspond to average shaft diameter and spline configurations for splines the wear of which is measured.

It is important to note that the gage wear indicators operate synergistically in tandem to effectively double the measurement values and reduce uncertainty. That is, because each standard rotates angularly to engage different radially extending spline surfaces, the angular rotation is doubled because the measurement from each standard in opposite directions relative to the splines is additive. This embodiment thus provides for more precise and accurate gage wear indications, mostly by reducing the statistical error that would derive from single indicator reading errors as is obtained in the first embodiment. However, as will be discussed below, there are several considerations that affect the types of measurements that are made by the two different inner surfaces 233, 243 when the standard teeth engage the splines of the worn section 142 of shaft 140. For example, because the shaft 140 has splines 143 that include both front facing and rear facing surfaces, one standard will measure the wear on the forward-facing spline surfaces 145 while the other standard will measure the wear on the rearward-facing spline surfaces 147. Normally both these surfaces should wear at the same rate. If the wear rate is not identical, however, then the indicators of wear will be affected and remedial considerations will be required to compensate for uneven wear.

Another difference in the embodiments shown in FIGS. 4-7 is the shape and configuration of the shaft 140, which has the splines 143 disposed at a position further removed from the front surface 146 than does the shaft 100 (FIGS. 1-3). The different embodiments of the inventive device 10, 210, etc. are each capable of accommodating the different types of shafts that are used in construction and industrial cranes and similar machines. That is, the spline wear of any shaft configuration is capable of being measured once the position of the worn portion 142 is known. It simply needs to be positioned by correctly adjusting the rod 96 so that the worn portion 142 engages the teeth of the standards 42, or 132, 142, etc. and then tightening lug nuts 197 to fix the horizontal position of rod 96. The horizontal position of rod 96 will thus control the horizontal position of shafts 100, 140 and 180 (FIGS. 8, 9) by curtailing the further insertion of the device 10, 210, etc. over the shaft when the end surface 95 (FIG. 7) of rod 96 engages with shaft end surface 146, to allow for the spline gage wear to be measured at the correct place on the shaft, that is, at the worn portion.

In the steps in the process that will be followed in insertion of the device 10 over the shaft 140, a difference in the procedure that is followed from that of the device 10 is readily apparent to those who possess ordinary skill in the art. As is seen in FIGS. 1-3, annular surface 33 of the central aperture of standard 32 has a diameter that is slightly larger than the outer shaft diameter, including the splines 103, to enable the device 10 to be inserted over the shaft 100. To engage the splines 103 with the corresponding splines of standard 42, the handle 48 is rotated slightly in the direction that will align the two sets of splines to enable the insertion to proceed. Once aligned, the shaft end continues its insertion until the end surface meets the opposed end surface 95 of the rod 96.

For the second embodiment in FIGS. 4-7, however, there are two sets of standard splines, splines 233 on the forward standard 232 and splines 243 on the rear standard 242. Thus, the procedure is modified in that alignment is required for both sets of splines 233, 243. To properly measure the angular rotation with the first embodiment device 10, the shaft 100 must be locked in place from rotation during the measurement procedure so that angular movement of the shaft does not add further uncertainty to the measurement of angular rotation value. Thus, the front standard 32 is locked in place and restricted from angular rotation by screwing in set screws 36 until they have made contact with the inner portion of front standard 32. Once this is locked in place, the amount of angular rotation of the rear standard 42 will indicate the degree of wear of the splines 103 being measured.

In using the second embodiment however, the shaft 140 requires freedom of motion to rotate within the machine (not shown) to which it is attached. This freedom of both sets of standards 232, 242 to rotate freely relative to the shaft 140 enables the dual measurement capability since one standard essentially will be measuring the wear on one side of a spline and the other standard on the opposite side of the spline 143. Thus, and assuming the wear on each side is substantially even, the rotation of one standard is additive to the rotation of the other standard to provide the dual indication of wear. Specifically, the front standard 232 being fixed relative to the frame 12 permits the shaft 140 to rotate from one extreme side and as this rotation is completed, the rear standard 242 will also rotate to the extreme limit allowed by the splines 143 albeit engaging the splines on the opposed side (Arrow B, FIG. 9). The rear standard 242 is rotated by the handle 48 to one side to obtain the "zero" point (Arrow A, FIG. 9), engaging both the radially extending walls of the splines 143. Handle 48 is then rotated toward the other side (Arrow B, FIG. 9) until the standard splines engage the spline on a first side, and continuing rotation with the handle 48 which in turn rotates the freely rotating shaft 140 until the second, opposed surface of shaft splines engage the splines of the front standard 232. Thus, the wear of both radially extending surfaces of the splines are included in the total angular rotation indicated by the sight mechanism comprised of the sights 50, 70 and target 80.

The materials for manufacture of the inventive device embodiments normally comprise a strong metal, preferably 4140 steel, in order to ensure dimensional integrity. Although stainless steel or aluminum may be contemplated for the non-critical components, e.g., frame 12, outer shells 234, 244 or pusher assembly 90, to reduce the weight of the final units to render them portable, these materials may not be suitable for the actual measurement elements, e.g., the standards, because of the possibility of the standard's spline wear leading to aberrant readings. Combinations of suitable materials may also be used, such as aluminum for the frame members 12, 14, 16, 18, while utilizing 4140 steel for the standards. The connecting materials, including the handle, set screws, etc., may also comprise 4140 steel, stainless steel, or other suitable connector materials, since these will be threaded and required to be robust to withstand repeated installation and changeovers of the standards to accommodate different types of splines. Discussion herein for purposes of description of materials will focus on the first embodiment, but it should be understood that it is applicable to all the above-described embodiments.

The optional pusher assembly 90 materials for mounting of the proposed device may comprise standard wheel studs, lengthened bolts or rods 96, 98, lug nuts 197 having corresponding thread specifications as the lengthened rods, all arranged to provide two functions. First, the rod 96 is set at a predetermined horizontal position by screwing or unscrewing the rod 96 at one end point of the rod 96 at rod head screw mechanism 99. The position of the end the forward end 95 of rod 96 will dictate the position of the shaft end which is inserted from the front end of device 10 toward the rod 96 when these two surfaces engage. Engagement of the two ends, that is, when the end 106 of shaft 100 meets the rod front end 95, will restrict further horizontal movement of device 10 over the shaft 100 so that worn part 104 of splines 103 will stop at a predetermined position where they will engage the corresponding splines of the standard 42, 242, 342 to enable measurement.

The pusher assembly 90 provides a second, actuator function for disengaging the device 10 when the splines 100 of the shaft 100 bind frictionally with the corresponding splines of standard 42. This is a not infrequent possibility because of the very exacting tolerances that are required for the device to accurately measure the wear of the splines 103. Once the wear measurement of a worn section 104 has been completed, device 10 is withdrawn from shaft 100 in the opposite direction as that with which it was inserted over the shaft 100. If difficulty arises in doing this because of friction between the splines, which may be unevenly worn, then the pusher assembly is utilized to actuate the rod 96 to push out the shaft 140 from the device 200. That procedure is simply to loosen the lug nuts 98, 197 and screw in the end screw 99 at the extremer rear of the pusher assembly 90 (FIGS. 1 and 2) far enough to disengage the shaft 140 from the splines of the standards 232, 242. Once it is disengaged, the user should be able to withdraw the device 200 from the shaft 140 to enable normal use of the machine with the shaft spline wear measurements being then tabulated and evaluated for whether there is a need to replace the shaft, requiring disassembly of the machine (not shown), usually a motor.

In a third embodiment of a gage wear measurement device 300 illustrated in FIGS. 8 and 9, the device has very similar stricture to that of the device 200 with the exception that the standards 332, 342 are shaped, oriented and dimensioned to accommodate a shaft 180 having a single keyway 182 disposed along the circumferential surface 184 and extending parallel to a longitudinal axis thereof. In operation, the opposed or driven member includes an internal keyway and a key (not shown) which engages the shaft and the internal member to actuate the shaft drive and perform its intended function. Keyway configurations are known in the industry and essentially comprise a single spline model that is in other respects similar to the multiple spline configuration of shafts 100, 140 of the previously described embodiments, except the spline is a single removable key that is subject to wear as are the splines of the other embodiments.

The two standards 332, 342, are preferably retained in a nested configuration as shown, to enable the indication of wear of the keyway in a dual or additive manner as in the second embodiment device 200 of the gage wear measurement device for use with splined gears. However, it should be understood that a keyway system for measuring the wear in a key/keyway actuator system can be used with a configuration in which the standards are not nested as shown in FIGS. 8, 9, but the configuration that is used to measure keyway wear can be similar to the configuration shown in FIGS. 1-3, and a person skill in the art can easily modify the system shown to the alternative configuration which is not discussed in detail herein for brevity.

Repeated acceleration and deceleration cycles of the machine using the shaft 180 wears the key that engages the two inter-rotating members, and may also wear the walls 184 of the keyway 182. The difference is that because all of the resultant loads are transmitted down the length of the shaft 300 and are concentrated on the key (not shown) which the shaft 180 drives, the wear mostly takes place on the key with some wear occurring on the radially extending walls 184 of the keyway 182. Thus, standards 332 must include a member 334 that engages the corresponding keyway 182 on the shaft 180. This member 334 takes the place of the standard splines shown in the previously discussed embodiments. Though not shown in these views, the front protruding nose of the standard 342 includes a corresponding end wall that has a central aperture that includes a radially inwardly extending "tooth" member (not shown) that separately engages the keyway 182. When the standards are rotated, as in the second embodiment device 200 described above, the member 344 engages one end wall 184 of the keyway 182, and the other "tooth" member of the rear standard 342 engages the opposed radial wall 184 of the keyway 182.

The procedure for changing out one or more standards in the devices 10, 210, 310 are essentially the same across all three platforms. That is, in the first embodiment device 10, if the shaft outer diameter, with the outer radial extent of the splines as defining the diameter, is the same for the shaft being measured, then only the rear standard 42 needs be changed out. Otherwise, the procedure is the same for changing both the standard pairs (32, 42; 232, 242; and 332, 342) if the dimeter and or spline configuration requires a change in the inner standard module to accommodate the different diameter/spline configuration. The changeover of standards usually is required when different shaft configurations for different types of machines are used. For the most part, however, there are several known and usual types for which standards can be manufactured and so, with a kit of several different standard pairs, will substantially cover the majority of the known shaft configurations. As previously discussed, the devices 10, 210, 310, only differ in the configuration of the standards, and changing out the standards can be done within the framework 12 and other assemblies which are common to all three embodiments.

Referring now to the preferred second embodiment of device 210 in FIGS. 4-7, the procedure for a changeover in a standard pair will be discussed. It should be understood however, that the changeover procedure is essentially identical for each of the devices 10, 210, 310 and that discussion of the second embodiment device 210 is only exemplary. After removal of the device 210 from the previous shaft 140, a determination of the standard configuration required for the gage wear measurement is made and the correct standard pair from the kit of standards that accompanies each device is made.

Removal of the previous standard pair follows the steps of disengaging the handle 48, the vertical plate 74, including the horizontal bead mount 72, removing the retaining set screws 36 holding the standards 232, 242 in place, then sliding out the standards, first standard 232 and then standard 242, which will have to be removed through the opening within the shell 234 after the front standard 232 has been removed to avoid the obstruction of the rod 96. To replace the standards with another pair from the kit that will correspond to the next shaft the wear of which is to be measured, the opposite procedure in reverse order is used.

In removing handle 48, it is disengaged from the connection with rear standard 242. While the connection is a threaded connection and handle 48 is shown as a long set screw that is unscrewed from the threaded hole 235 in the side of the standard base 239 (FIG. 5), other types of connections of handle 48 to base 241 will readily be understood to persons familiar these types of devices, such as, interference fit connections, etc. In any case, the handle 48 extends through elongate or oval aperture 46 (FIGS. 2, 4, 8) that is a through hole in the outer shell 44. The threaded end of handle 48 is screwed into the threaded hole 235 (FIG. 5) which aligns with the elongate hole 46. The engagement of the handle with the threaded hole 235 fixes the relative position of the standard 242 within the shell 44. However, to remove the standard 242 from the shell 244, the connection between the handle 48 and standard 242 must be broken by removing the handle 48. The handle connection also causes angular rotation of the standard 242 when the handle is moved in the directions of the arrows A, B (FIG. 9).

This mounting configuration and standard structural connections make their installation, removal and standard changeout convenient and feasible with the standard tools available in most users' toolboxes. As the standards are completely isolated from the axle, exchange with another unit from the kit can be completed in a very short time using standard hand tools the damaged shafts can be repaired without significant downtime to the end-user. Since the devices 10, 210, 310 are completely mechanically selfcontained, batteries do not have to be recharged, to avoid adding weight to the device, and calibration of electronic devices is not required since the critical elements are robust and operate on mechanical indication.

Figure 10:
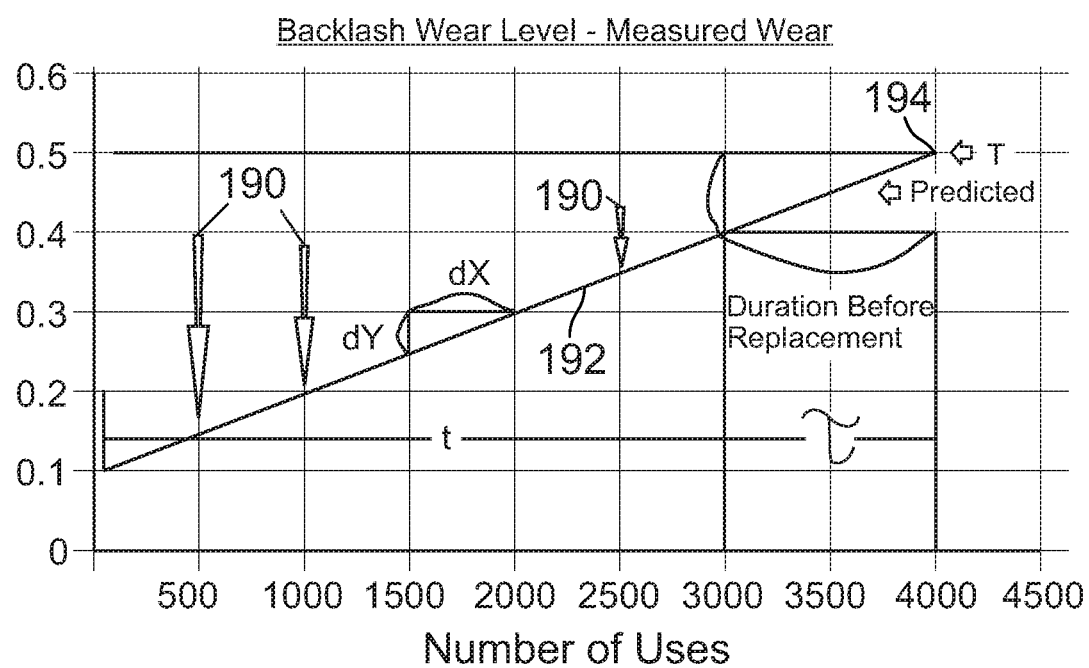
FIG. 10 is a graph showing a plot of general wear as measured by the inventive device with a warning zone indicator as to when the spline requires replacement and a prediction of when the replacement will be due, in accordance with either tabulated wear guidelines established by long use and statistical records, or by factory specifications.

Referring now to FIG. 10, a graphical illustration of the gage wear indication as measured by the devices 10, 210, 310 is shown. The x axis represents the number of estimated uses of the machine, e.g., industrial or horizontal crane, that require to place a large load on the shaft. Although these may be estimated, modern equipment may utilize a counting algorithm to provide more precise readings on number of uses and even on the pressure load applied on the shaft splines or keyways. Thus, the following discussion is a simple and quick way to correlate the number of uses with how quickly the spline wear is occurring so as to provide some measure of certainty to the process of evaluation of shaft integrity. Of course, a person of skill in the art may use the manual measurement derived form use of the devices 10, 210, 310 at periodic intervals and input them into an integrated system using a central processing unit (CPU) to provide functionality evaluation after a correlated study of spline gage wear, to provide a user with the necessary wear, including a wide safety margin for error, of a threshold that would be indicative of the need for shaft replacement. Automated versions of the device, using an internal or external calculator, is contemplated, but not discussed herein for brevity. As stated above, the use and wear of the splines/keyways is assumed to be essentially uniform for this discussion, but both the manual and any future integrated system can accommodate for non-uniform wear simply be providing a non-linear curve when the periodic measurements are tabulated.

A more rigorous and theoretical exposition of the wear gage measurement of splines and keyways may be forthcoming in the future. However, the following is a proposed mechanism that may be utilized for the purposes of this invention. As periodic measurements are made in the field with respect to a particular device, wear measurements are tabulated on a graph such as the one shown in FIG. 10. While the number of uses is shown on the X-axis, if there is a reliable estimate of wear over specific time periods for a particular shaft that has been made by a particular user, these may be used to corroborate the wear indication and replacement threshold. Measurement readings are tabulated, for example, at the points on the graph shown by arrows 190. Over a period of time dX, the wear is graphed and dY is calculated and so the shape of curve 192 provides a resultant algorithm for use as a rough estimate of the wear that will occur over time t or the number of uses X, and perhaps severity of use, of the shaft. Thus, the time for a replacement, i.e., the point 194 in time (or uses) at which replacement is needed is calculated is $$\text{Time Before Replacement Point} = (R-Y_0)/(dY/dX) = (dX/dY)(R-Y_0)$$

where $Y_0$ is Initial Measurement (Zero point)
t=Time at measurement
$Y_t$ is Measurement at time t (periodic measurement point)
T is Time at specified backlash replacement threshold
τ is the remaining service life of component after time t
dY/dX is Slope of line fitted to the measured data points
R is Backlash upper limit (replacement point where new shaft is needed).
Assuming $Y_T=R$ (Wear at threshold use)
$(dY/dt)^{-1}=dt/dY$
Assuming the function is monotonic increasing implies $Y_t \leq Y_{(t+1)} \leq Y_T$ Therefore dY/dt>0 most generally.

$$\text{Total service life } T=(R-Y_0)/(dY/dt)=(dt/dY)(R-Y_0)=(dt/dY)(Y_T-Y_0).$$

While the theoretical and predicted total service life T can be generally relied upon, the periodic measurements must be graphed at each actual measurement to ensure that the actual wear meets the predicted wear, or that some unexpected event that may have affected the wear rate has not been present between measurements. Thus, the periodic measurements will always provide the actual standard for when the shaft wear is reaching a critical level and will require replacement of the worn shaft.

The invention herein has been described and illustrated with reference to the embodiments of FIGS. 1-10, but it should be understood that the features and operation of the invention as described are susceptible to modification or alteration without departing significantly from the spirit of the invention as disclosed above. For example, the dimensions, size and shape of the various elements may be altered to fit specific applications or for ease of manufacture or portability. Accordingly, the specific embodiments illustrated and described herein are for illustrative purposes only and the invention is not limited except by the following claims.

What is claimed is:

1. A portable shaft wear measurement device for measuring wear on a drive shaft, the drive shaft having a driving element, the wear measurement device comprising:
   (a) a frame having at least one longitudinal frame member having a forward and a rear end;
   (b) a shaft guide being positioned at a forward end of the frame being dimensioned and oriented to enable insertion over the shaft for which wear is being measured;
   (c) a rear standard having a central aperture including an inner surface being dimensioned and oriented to enable insertion over the shaft, the inner surface of the central aperture including at least one corresponding element that provides for engagement in a mating relationship with the drive element of the drive shaft, the rear standard being angularly rotatable around a central axis, the degree of rotation of the standard being constrained by the engagement of the drive element of said shaft and the corresponding element of the standard;
   (d) a wear indicating assembly attached to said rear standard, and capable of angularly rotating therewith, the wear indicator having an indicator that is disposed radially outwardly from the central axis;
   (e) a sight mechanism for determining the amount of angular rotation of the standard and wear indicating assembly as constrained by the by the engagement of the drive element of said shaft and the corresponding element of the standard, the sight mechanism coupled with the wear indicating assembly providing a measurement of wear in the drive element,
      wherein the amount of angular rotation of the standard and wear indicating mechanism permitted by the constraint on rotation by engagement of the elements being varied by the amount of wear of the drive element.

2. The portable shaft wear measurement device according to claim 1 wherein the shaft guide element further comprises a front standard having a central aperture including an inner surface being dimensioned and oriented to enable insertion over the shaft, the inner surface of the front standard central aperture including at least one corresponding element that provides for engagement in a mating relationship with the drive element of the drive shaft, the front standard being angularly rotatable around a central axis, the degree of rotation of the standard being constrained by the engagement of the drive element of said shaft and the corresponding element of the standard.

3. The portable shaft wear measurement device according to claim 2 wherein the drive element further comprises splines in a gear shaft and the front standard inner surface has teeth disposed on the rear standard inner surface that correspond in dimension and orientation to the splines of the drive shaft.

4. The portable shaft wear measurement device according to claim 2 wherein the rear standard and front standard are removable and replaceable by an alternate standard pair standard selected from a kit of standard pairs.

5. The portable shaft wear measurement device according to claim 1 wherein the drive element further comprises splines in a gear shaft and the rear standard inner surface has teeth disposed on the rear standard inner surface that correspond in dimension and orientation to the splines of the drive shaft.

6. The portable shaft wear measurement device according to claim 1 wherein the drive element further comprises a keyway and the rear standard inner surface having a key that corresponds in dimension and orientation to the keyway of the drive shaft.

7. The portable shaft wear measurement device according to claim 6 wherein the drive element further comprises a keyway and the front standard inner surface having a key that corresponds in dimension and orientation to the keyway of the drive shaft.

8. The portable shaft wear measurement device according to claim 1 wherein the sight mechanism further comprises a rear sight disposed adjacent the rear end of the frame and a target disposed adjacent the forward end of the frame.

9. The portable shaft wear measurement device according to claim 1 wherein the rear standard is removable and replaceable by an alternate standard selected from a kit of standards.

10. A portable spline shaft wear measurement device comprising:
a) a frame including locations sized, dimensioned and oriented for attachment of other elements;
b) a front spline standard receiver assembly;
c) a rear spline standard receiver assembly having internal elements for receiving in a mating relationship an end of a spline shaft the wear of which is to be measured, comprising an outer shell, a circular spline shaft standard receiving member, a handle, attached to the circular spline shaft standard receiving member limiting the degree of rotation of the circular spline shaft standard receiving member within the shell when the handle is transposed, and a sighting index protrusion, attached to the circular spline shaft standard receiving member for rotating therewith when the handle is transposed;
d) a line of sight rearward aperture attached to the frame at a rearward position; and
e) an indicator target index having predetermined indicia affixed thereon for providing an indication of the amount of rotation permitted of the circular spline shaft standard receiving member when the handle is transposed whereby the line of sight from the aperture to the sighting index as viewed in line with the indicator target providing an indication, as measured from the difference in position of the sighting index from a predetermined position when the handle is transposed, of the degree of rotation limited by the spline when the circular spline shaft standard receiving member is rotated therearound;
wherein the difference in the value as provided by the sighting index on the target indicia is indicative of an average wear of the spline shaft gage.

11. A method of measuring the wear gage of a spline shaft using a portable device having a forward internal spline standard assembly and a rearward internal spline standard assembly comprising the steps of:
a.) dismantling a machine having spline shaft end portion with a profile the wear of which is to be measured so that the end portion of the shaft is free of any attached elements and the splines are unencumbered;
b.) fixing the position of the spline shaft relative to the machine to which the spline shaft is attached;
c.) disposing a standard in the rearward internal spline standard assembly having an internal profile matching the profile of the spline shaft end portion for which the wear is being measured;
d.) transporting the device to the spline location;
e.) inserting a free end of the spline into and through apertures disposed in spline standards in each of the forward internal spline standard assembly and the rearward internal spline standard, the rearward spline standard having corresponding gage matching the gage of the spline;
f.) fixing a first extreme position of the rearward spline standard by rotating same within the rearward spline standard;
g.) calibrating the first extreme position to which the rearward spline standard can be rotated by noting the position of the standard by a relative rotation index mechanism;
h.) adjusting the rearward spline standard to second extreme position as far as is limited by the spline, the amount of rotational position adjustment being constrained by the amount of backlash being generated by the wear in the spline;
i.) measuring the difference in rotational angular displacement between the first and second extreme positions.

12. The method of measuring the wear gage of a spline shaft according to claim 11 further comprising the step of:
j) tabulating the amount of displacement in the angular positions to provide an indication of gage wear and to establish, when compared to a standard expected wear, whether the spline shaft requires replacement.

* * * * *